United States Patent
Min et al.

(10) Patent No.: US 11,388,390 B2
(45) Date of Patent: Jul. 12, 2022

(54) WEARABLE ELECTRONIC DEVICE ON HEAD

(71) Applicant: LG ELECTRONICS INC., Seoul (KR)

(72) Inventors: Dongog Min, Seoul (KR); Seungyong Shin, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 16/495,072

(22) PCT Filed: Aug. 28, 2019

(86) PCT No.: PCT/KR2019/010989
§ 371 (c)(1),
(2) Date: Sep. 17, 2019

(87) PCT Pub. No.: WO2021/040084
PCT Pub. Date: Mar. 4, 2021

(65) Prior Publication Data
US 2021/0409675 A1    Dec. 30, 2021

(51) Int. Cl.
*H04N 13/344* (2018.01)
*G02B 27/01* (2006.01)
*G06F 3/14* (2006.01)

(52) U.S. Cl.
CPC ....... *H04N 13/344* (2018.05); *G02B 27/0172* (2013.01); *G02B 27/0176* (2013.01); *G06F 3/14* (2013.01); *G02B 2027/0141* (2013.01)

(58) Field of Classification Search
CPC .............. H04N 13/344; G02B 27/0172; G02B 27/0176; G02B 2027/0141; G06F 3/14
See application file for complete search history.

(56) References Cited

U.S. PATENT DOCUMENTS

| | | | |
|---|---|---|---|
| 10,534,115 B1 * | 1/2020 | Calafiore | H01J 37/20 |
| 2013/0249787 A1 * | 9/2013 | Morimoto | G06F 3/017 |
| | | | 345/156 |
| 2018/0003919 A1 * | 1/2018 | Song | G02B 7/12 |
| 2018/0164594 A1 * | 6/2018 | Lee | G02B 27/0176 |

(Continued)

FOREIGN PATENT DOCUMENTS

| | | |
|---|---|---|
| JP | 2013200325 | 10/2013 |
| KR | 1020140130321 | 11/2014 |

(Continued)

OTHER PUBLICATIONS

PCT International Application No. PCT/KR2019/010989, International Search Report dated May 27, 2020, 3 pages.

*Primary Examiner* — Christopher E Leiby
(74) *Attorney, Agent, or Firm* — Lee Hong Degerman Kang & Waimey

(57) ABSTRACT

Disclosed is an electronic device according to the present invention. The electronic device according to the present invention may open and close pinholes formed in the electronic device, depending on whether an image is output to a display panel. The electronic device according to the present invention may be associated with an artificial intelligence module, a robot, an augmented reality (AR) device, a virtual reality (VR) device, a device related to a 5G service, and the like.

15 Claims, 18 Drawing Sheets

(56) References Cited

U.S. PATENT DOCUMENTS

| | | | | |
|---|---|---|---|---|
| 2019/0227329 A1* | 7/2019 | Han | .................... | G02B 27/0172 |
| 2019/0377186 A1* | 12/2019 | Collins | .............. | G02B 27/0172 |
| 2021/0333563 A1* | 10/2021 | Min | .................... | G02B 27/0172 |

FOREIGN PATENT DOCUMENTS

| | | |
|---|---|---|
| KR | 1020170064389 | 6/2017 |
| KR | 1020190018518 | 2/2019 |
| KR | 1020190086514 | 7/2019 |

* cited by examiner

[FIG. 1]
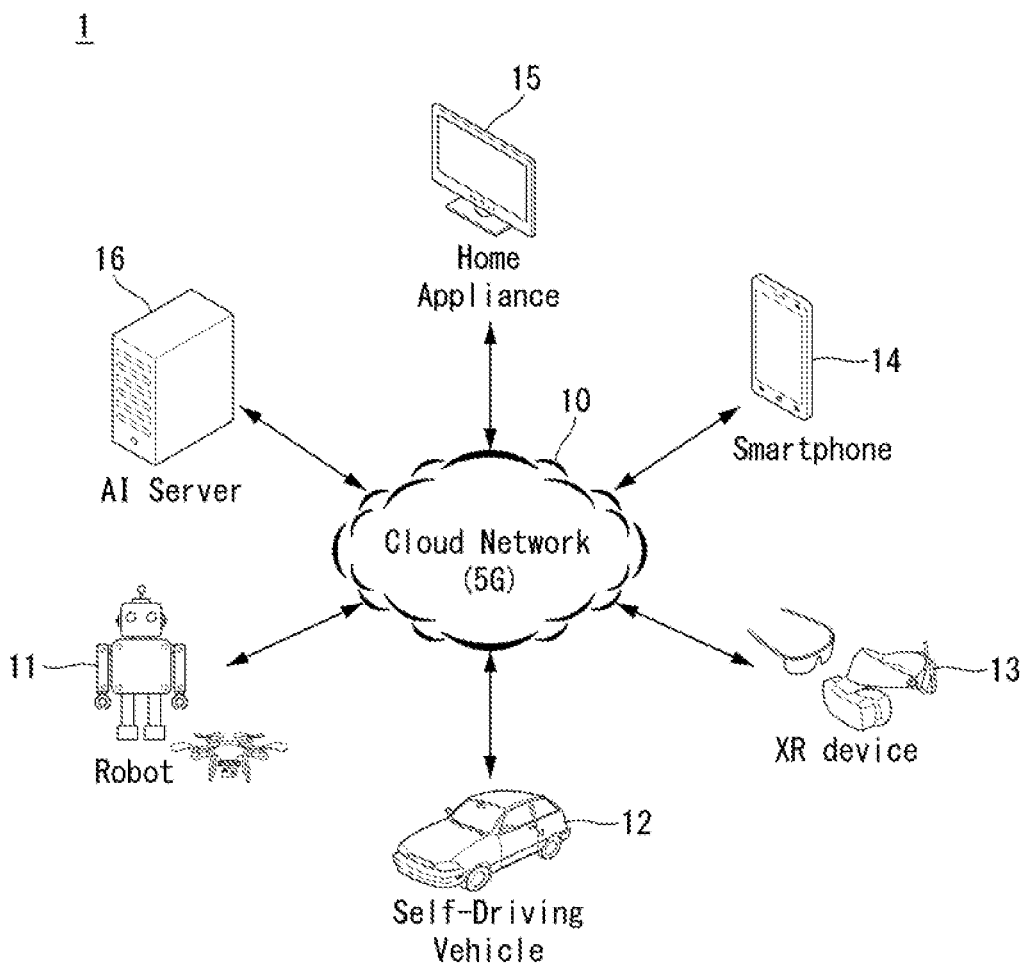

[FIG. 2]
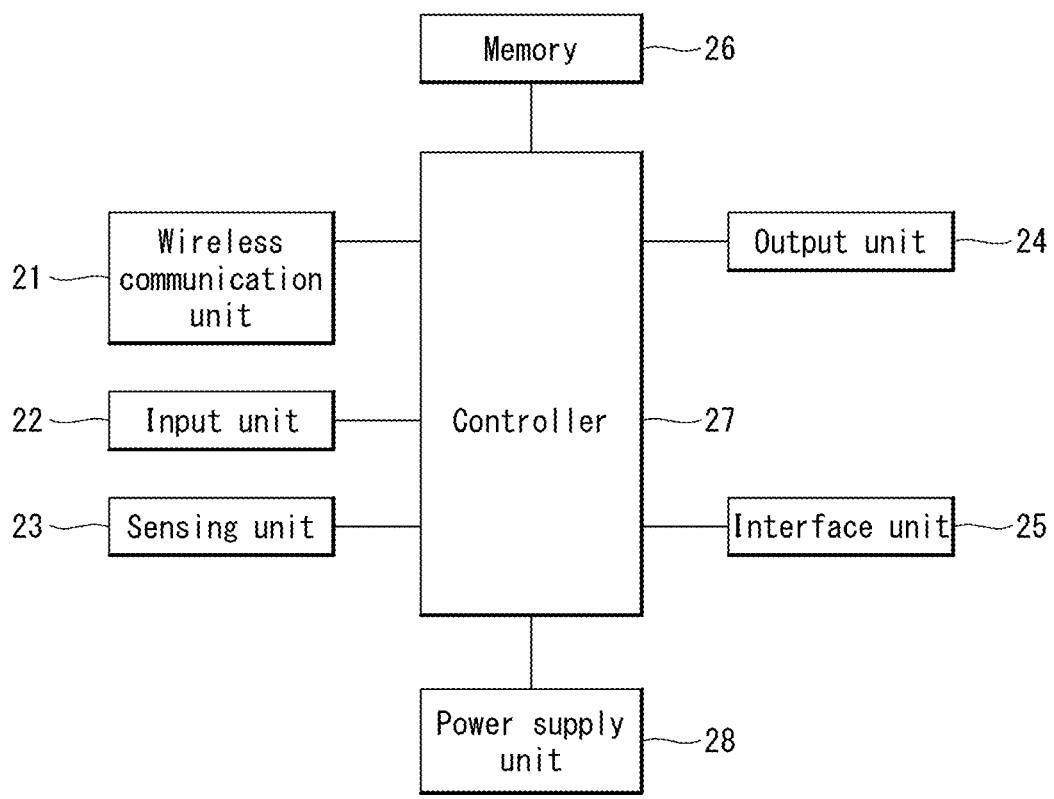

[FIG. 3]
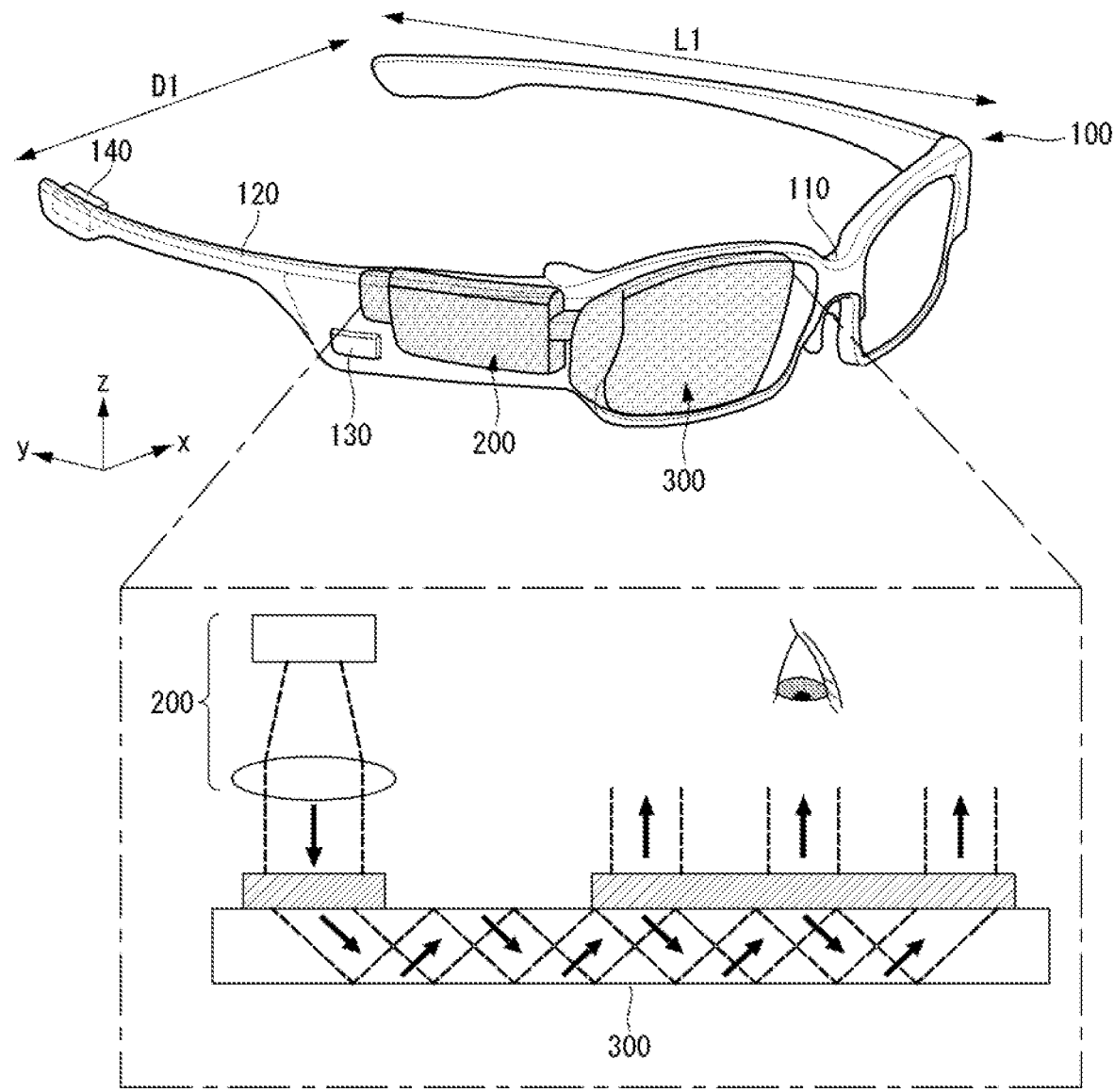

[FIG. 4]
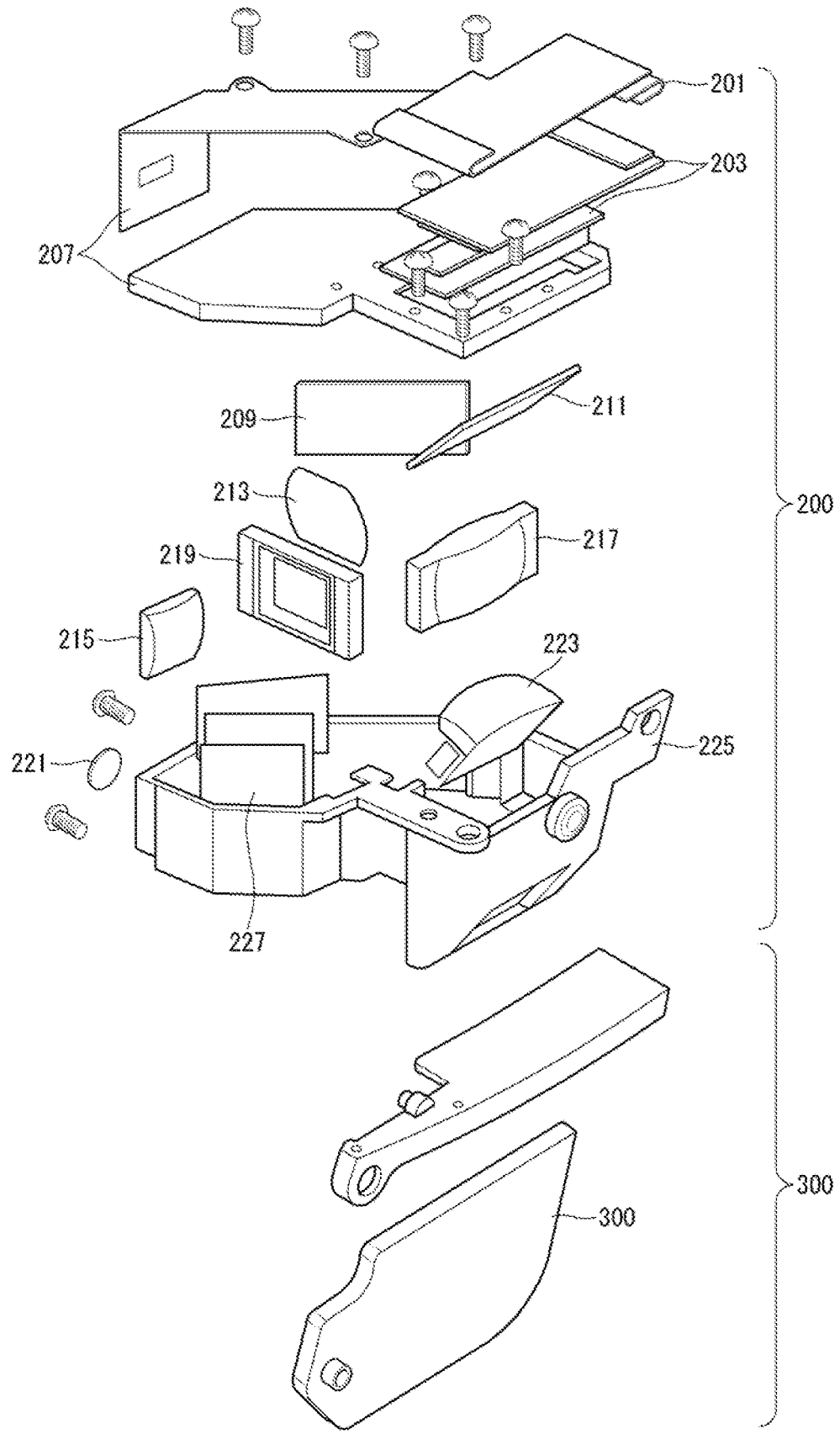

[FIG. 5]
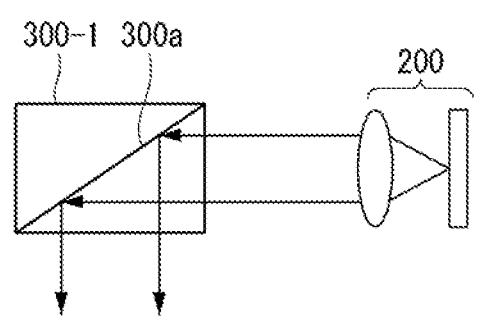 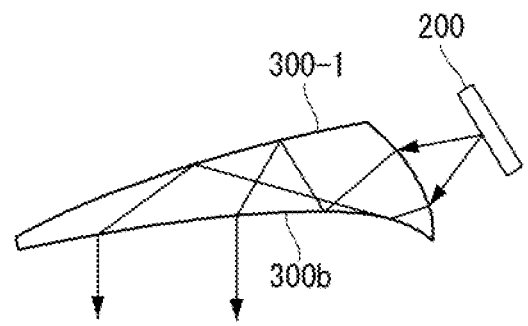
 
(a) (b)

[FIG. 6]
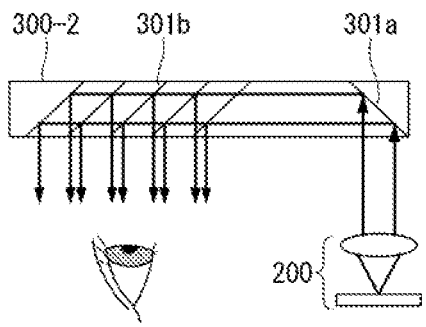
(a)
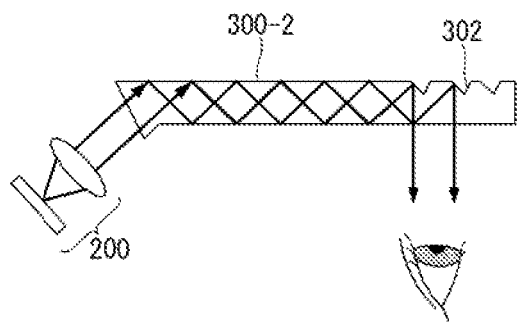
(b)
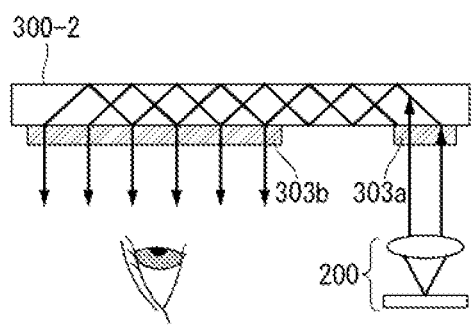
(c)
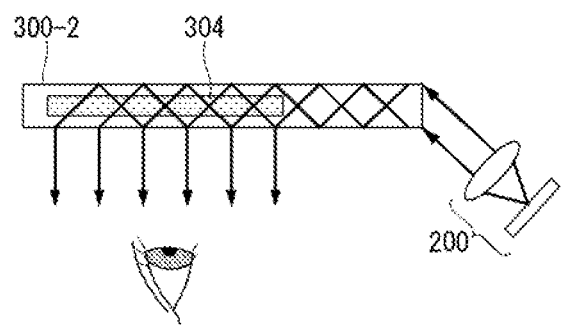
(d)
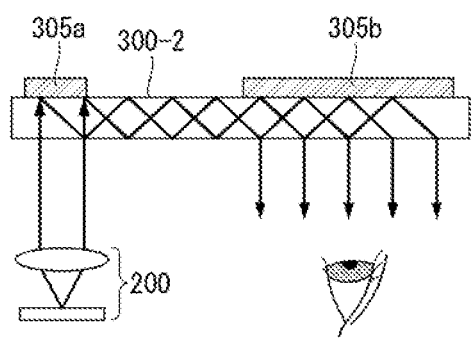
(e)
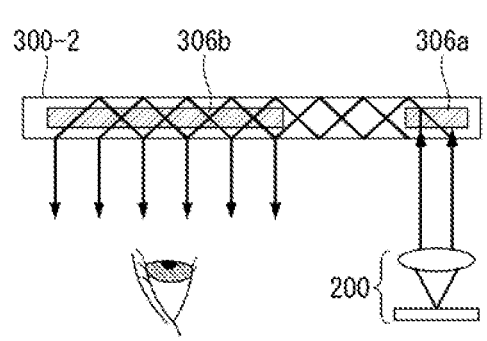
(f)

[FIG. 7]
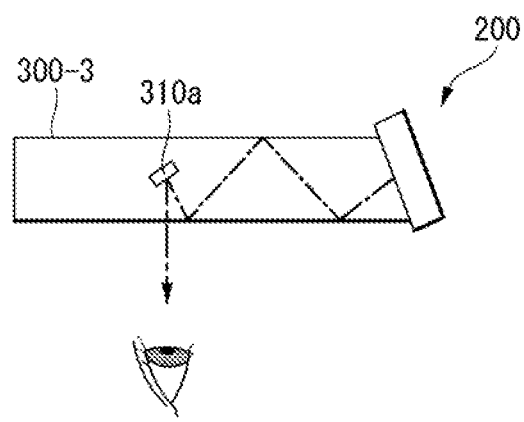
(a)
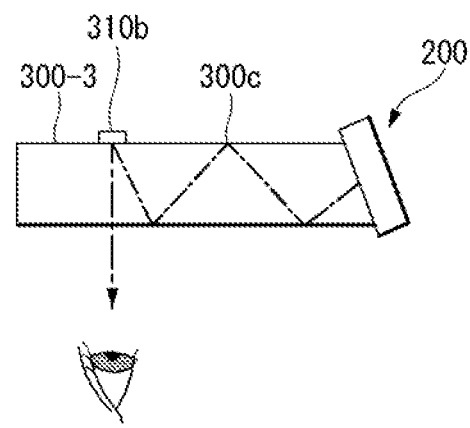
(b)
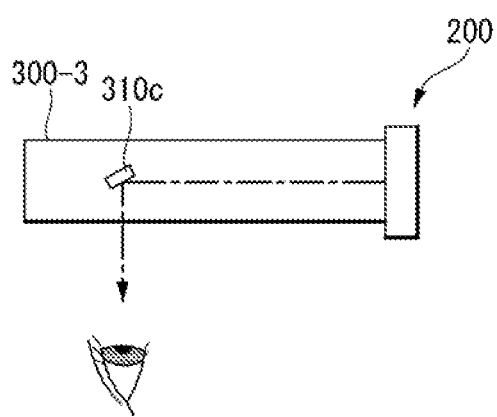
(c)
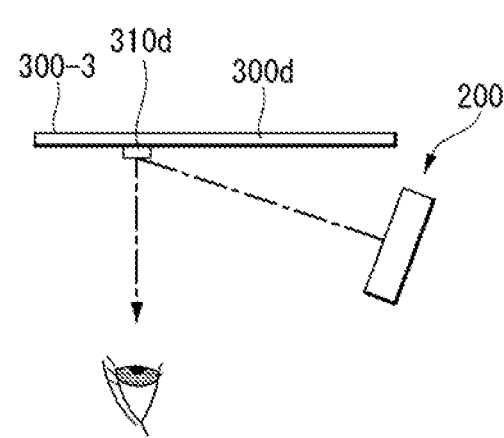
(d)

[FIG. 8]
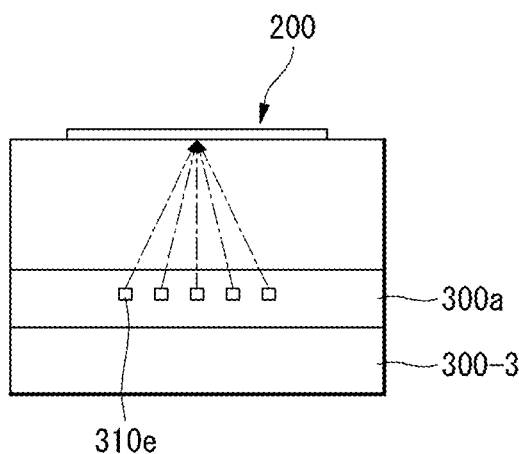
(a)
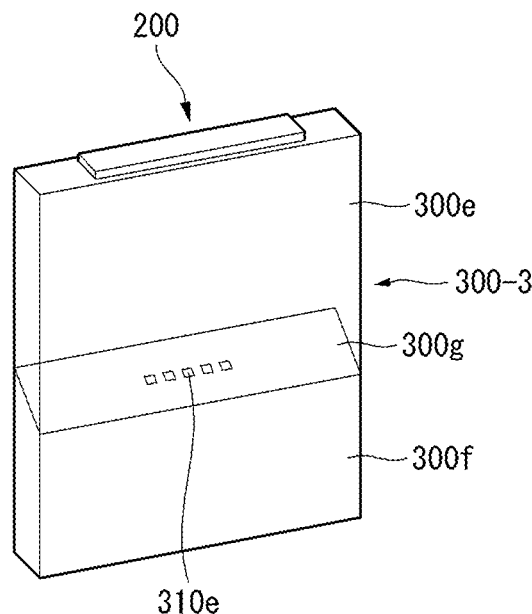
(b)
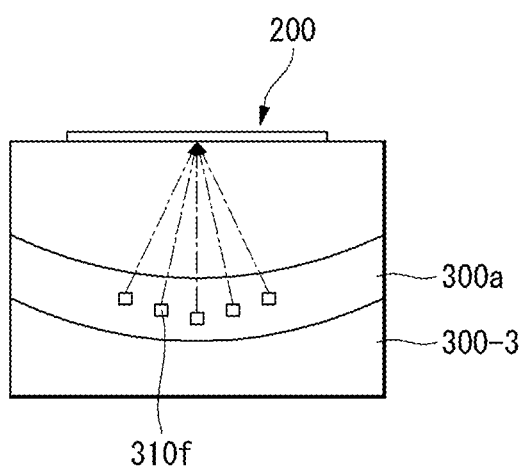
(c)
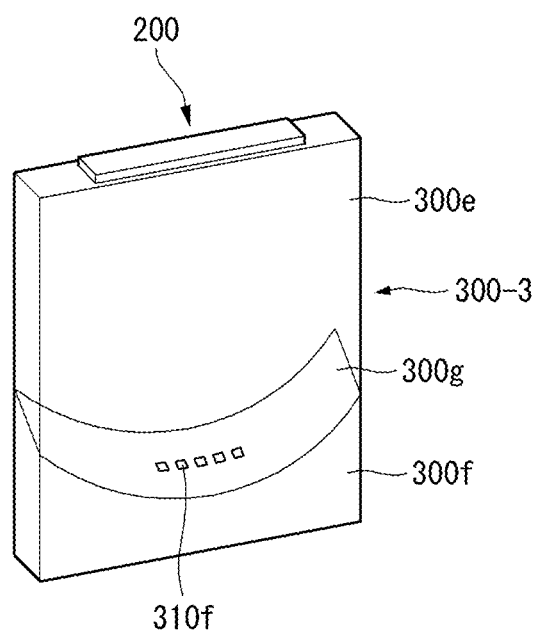
(d)

[FIG. 9]
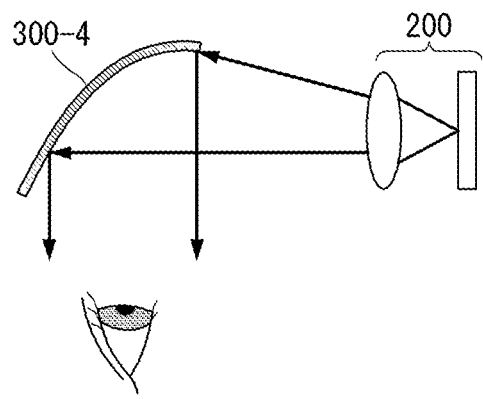
(a)
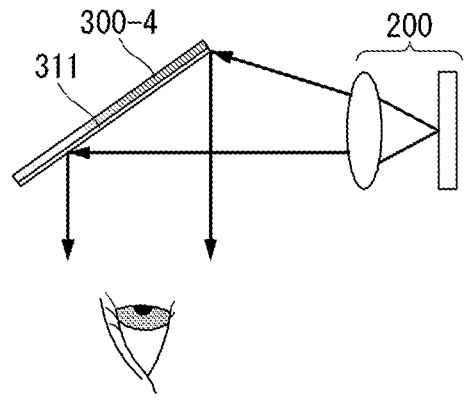
(b)
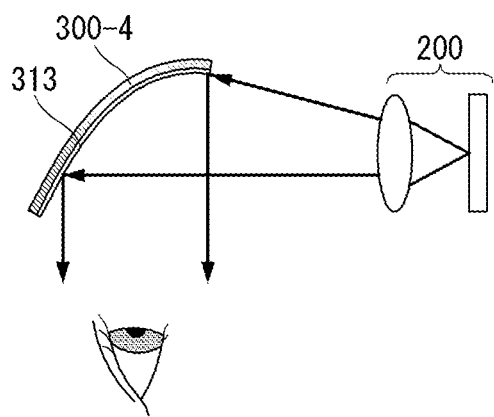
(c)

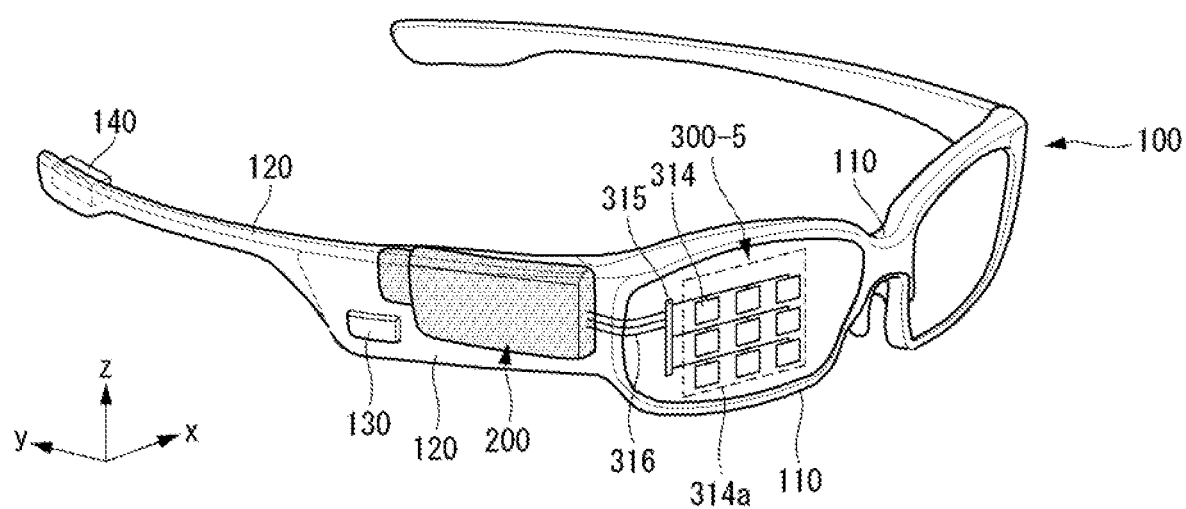
[FIG. 10]

[FIG. 11]
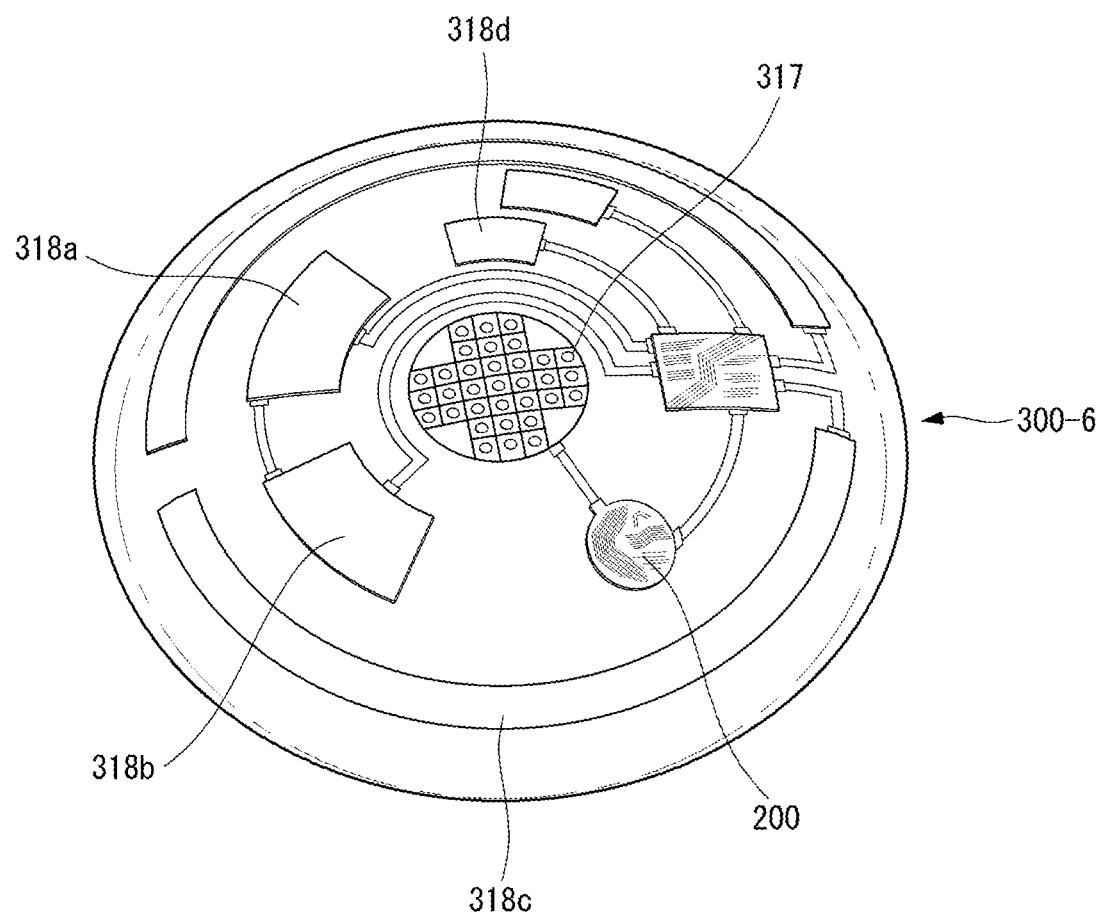

[FIG. 12]
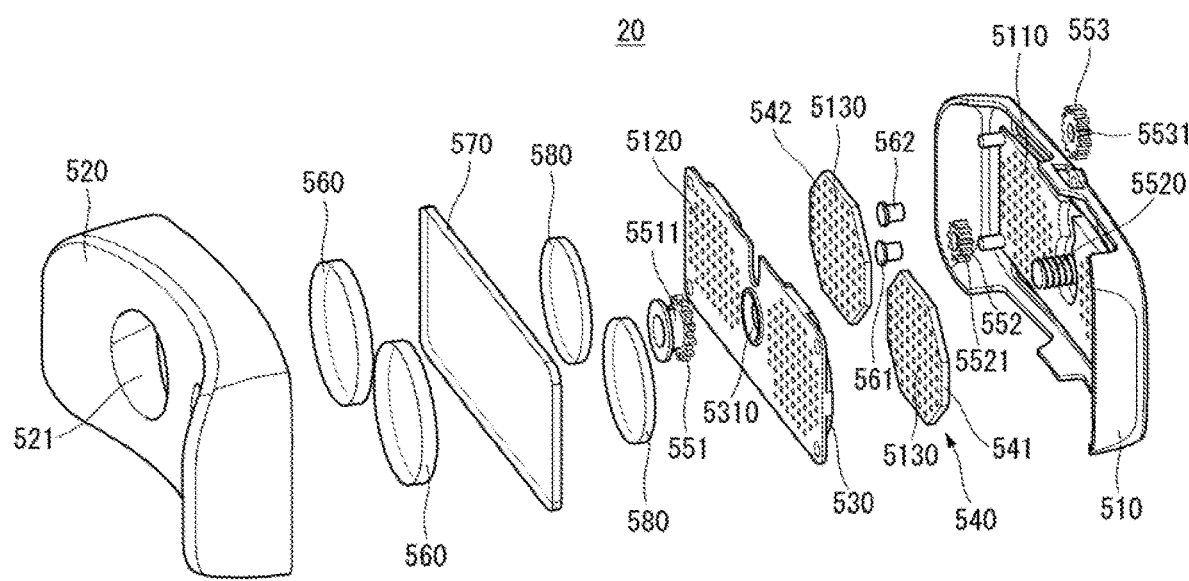

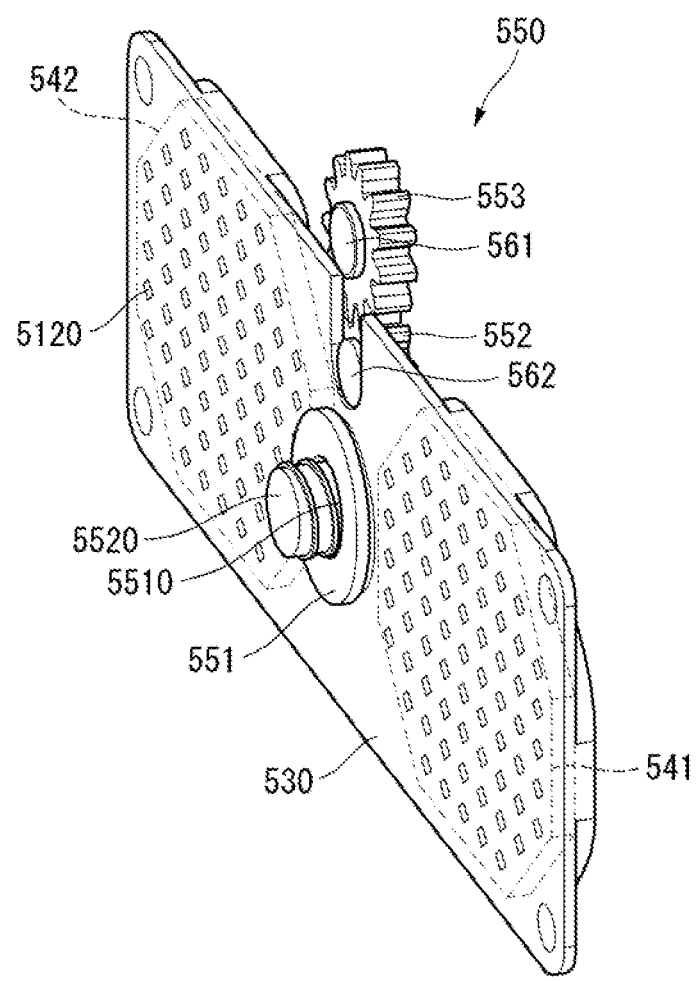
[FIG. 13]

[FIG. 14]
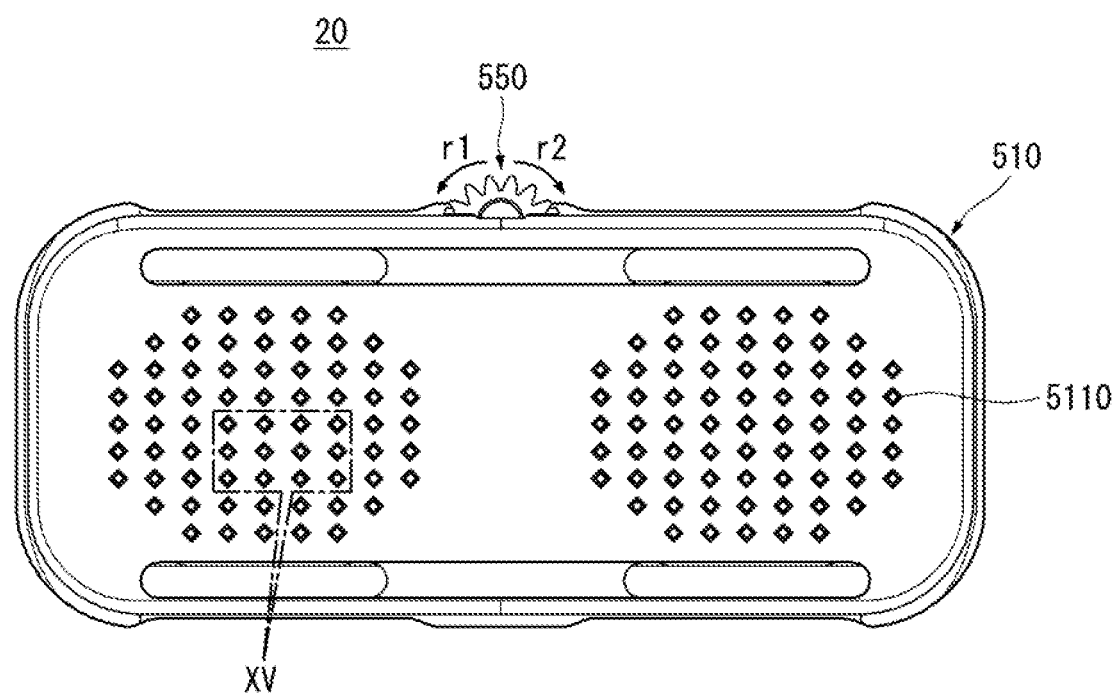

[FIG. 15]
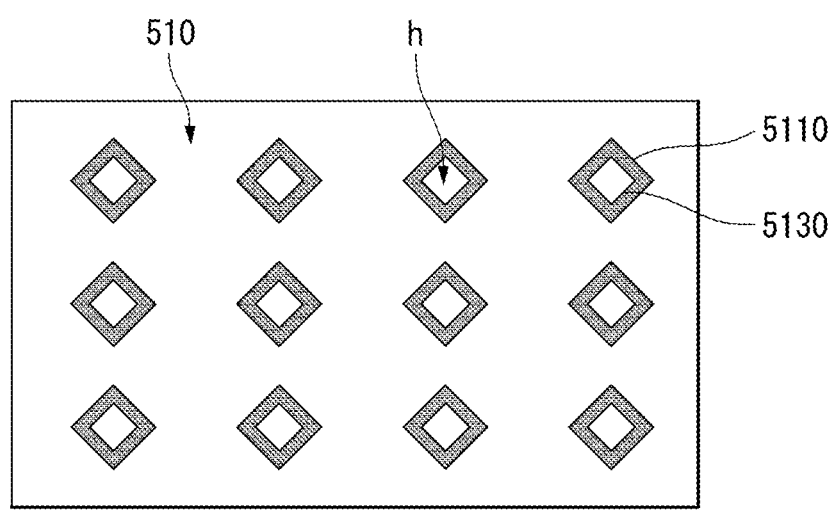

[FIG. 16]
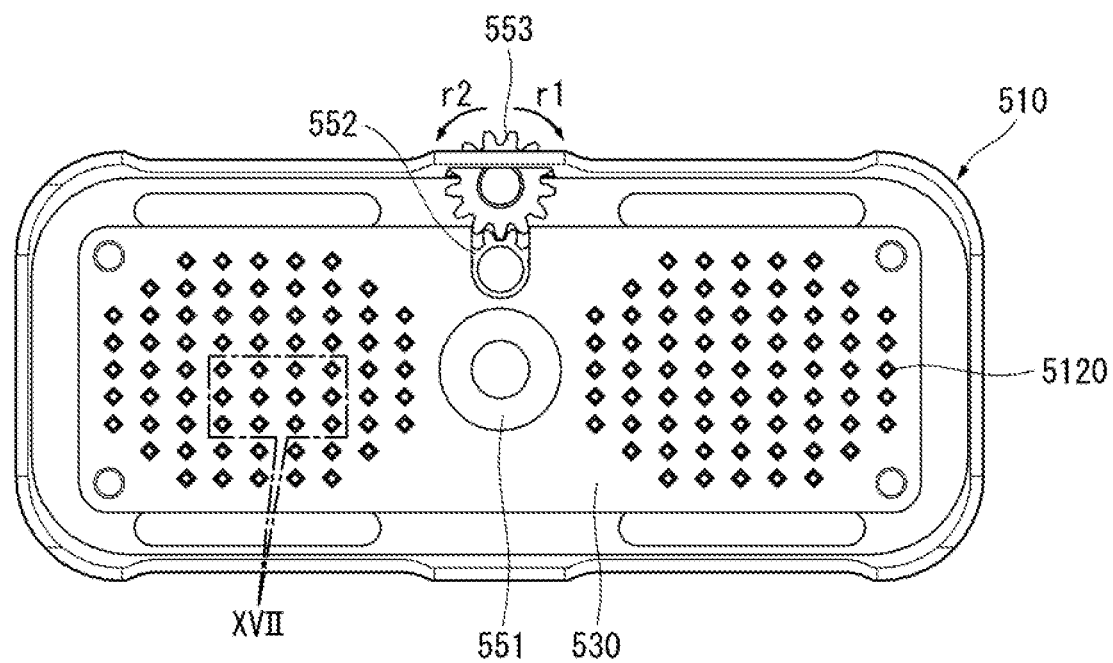

[FIG. 17]
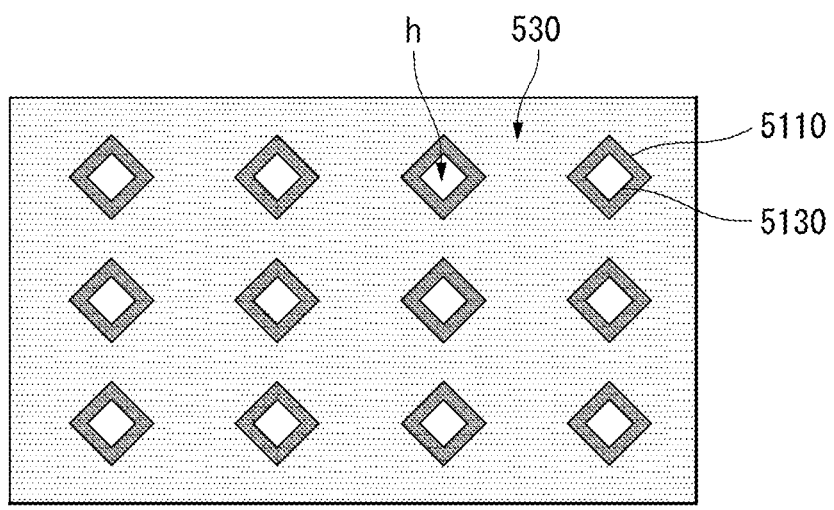

[FIG. 18]
(a)
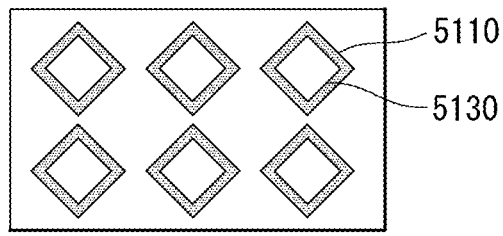
(b)
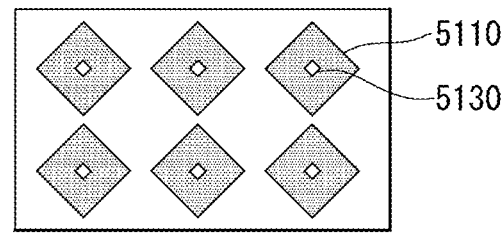

WEARABLE ELECTRONIC DEVICE ON HEAD

CROSS-REFERENCE TO RELATED APPLICATIONS

This application is the National Stage filing under 35 U.S.C. 371 of International Application No. PCT/KR2019/010989, filed on Aug. 28, 2019, the contents of which are hereby incorporated by reference herein its entirety.

TECHNICAL FIELD

The present invention relates to a wearable electronic device on a head, and more particularly, to an electronic device capable of opening and closing a pinhole formed in the electronic device according to whether an image is output.

BACKGROUND ART

As a device mainly used for virtual reality (VR), a head-mounted display (HMD) refers to a digital device where a display device is worn on a head, like glasses or a helmet, and allows multimedia contents to be viewed with naked eyes.

Therefore, the HMD generally includes a display module for implementing an image. For example, the display module may include a liquid crystal panel including a liquid crystal and an organic light emitting diode (OLED) panel including an organic light emitting device. In addition, in order to enable a user wearing the HMD to visually recognize an image implemented by the display module at a close distance to the eyes, the display module included in the HMD consists of near-eye display optics.

In particular, since the electronic device used for the VR in the related art has to output an image while screening the eyes of the user in front, there is an inconvenience in that the user may not view an external object in the state of wearing the electronic device, regardless of whether the image is output.

In order to eliminate the inconvenience, the electronic device used for the VR in the related art is equipped with a separate camera to capture an image outside the electronic device with the camera and provide the outside image to a display panel. However, since there is a difference in size between the real object and the photographed image or in some cases, the image is distorted, it is difficult for the user to recognize the object outside the electronic device.

DISCLOSURE

Technical Problem

The present invention has been made to meet above-mentioned needs and to solve the problems.

An object of the present invention is to provide an electronic device used for VR, AR, mixed reality (MR), and the like, allowing an external object to be viewed in the state of wearing the electronic device, regardless of whether an image is output.

Technical Solution

An electronic device according to an embodiment of the present invention includes: a first housing having a plurality of first pinholes formed at a position corresponding to an eye of a user; a second housing coupled to the first housing and coming into contact with a face of the user to cover the eye of the user; a view control plate having a plurality of pinholes formed therein; a pad disposed between the view control plate and the first housing and having a plurality of pinholes formed therein; and a moving unit moving the view control plate toward the first housing. An accommodating part is formed in the interior created by the first housing and the second housing coupled to each other, and the view control plate and the pad are disposed in the accommodating part, and the pad is deformed, such that diameters of the third pinholes are reduced, when the view control plate is moved by the moving unit.

The plurality of first to third pinholes may be disposed on the same optical axis defined by the eye of the user to correspond to one another, the moving unit may be configured to move the view control plate forward and backward, and the pad may be compressed when the view control plate moves toward the first housing.

The pad may include a first pad and a second pad, and the first pad and the second pad may be disposed to correspond to both eyes of the user.

The pad may be elastic.

The moving unit may include first to third gears, the first gear may have a first thread formed along an inner circumferential surface of a first hole formed in a central portion of the first gear, and the first housing further may include a second thread for male and female engagement with the first thread.

The moving unit may include a first rod and a second rod fixing the second gear and the third gear to the first housing, the second gear and the third gear may include a second hole and a third hole, respectively, and the first rod and the second rod may be coupled to the second hole and the third hole, respectively.

The first gear may be connected to the second gear, and the second gear may be connected to the third gear, the second gear may rotate in a second direction, and the first gear may rotate in the first direction when the third gear is rotated in a first direction, and the second direction may be a direction opposite to the first direction.

The view control plate may further include a gear receiving opening to which the first gear is coupled.

A portion of the third gear may be exposed outside the second housing such that the user rotates the third gear by hand.

The electronic device may further include: a fisheye lens disposed inside the accommodating part and mounted in the second housing; and a transparent display panel disposed between the view control plate and the fisheye lens.

The electronic device may further include a counter lens disposed between the transparent display panel and the view control plate.

The electronic device may further include a control unit controlling the moving unit to move the view control plate. The control unit may be configured to: control the moving unit to move the view control plate toward the first housing, when an image is output to the transparent display panel; and control the moving unit to move the view control plate toward the second housing, when no image is output to the transparent display panel.

The number of the first to third pinholes may be all the same.

The electronic device may further include a head unit connected to the second housing. The head unit may include: a headrest surrounding the head of the user; and a band adjustable in length according to a head size of the user.

The electronic device may further include: a sensing unit for sensing an external digital device other than the electronic device; an inter-device communication module allowing data transmission and reception between the external digital device sensed by the sensing unit and the electronic device; a processor classifying information to be displayed on the transparent display panel when the information on the external digital device is received through the inter-device communication module; and a memory storing data for operation of the electronic device. The processor may be configured to classify the information into a graphical user interface stored in advance in the memory to be displayed on the display.

Advantageous Effects

Since a user may recognize an external object without removing the electronic device according to the present invention, that is, while wearing the electronic device regardless of whether the image is output, the electronic device provides convenience for use.

DESCRIPTION OF DRAWINGS

FIG. 1 is a conceptual diagram illustrating an embodiment of a 5G network environment in which heterogeneous electronic devices are connected to a cloud network.

FIG. 2 is a block diagram illustrating a configuration of an electronic device including a display module according to an embodiment of the present invention.

FIG. 3 is a perspective view of an augmented reality electronic device according to an embodiment of the present invention.

FIG. 4 is an exploded perspective view illustrating a control unit according to the embodiment of the present invention.

FIG. 5 is a diagram illustrating an embodiment of a prism type optical element.

FIG. 6 is a diagram illustrating an embodiment of a waveguide type optical element.

FIGS. 7 and 8 are diagrams illustrating an embodiment of a pin mirror type optical element.

FIG. 9 is a diagram illustrating an embodiment of a surface reflection type optical element.

FIG. 10 is a diagram illustrating an embodiment of a micro-LED type optical element.

FIG. 11 is a diagram illustrating an embodiment of a display unit used for a contact lens.

FIG. 12 is an exploded perspective view of the electronic device according to the present invention.

FIG. 13 is an exploded perspective view illustrating coupling of a view control plate and a moving unit according to an embodiment of the present invention.

FIG. 14 is a front view of the electronic device according to the present invention when viewed from the front.

FIG. 15 is an enlarged diagram of the XV part shown in FIG. 14.

FIG. 16 is a diagram illustrating that the view control plate is coupled to a first housing according to the present invention.

FIG. 17 is an enlarged diagram of the XVII part shown in FIG. 16.

FIG. 18 is a diagram illustrating the principle of controlling field of view by the view control plate according to the embodiment of the present invention.

MODE FOR INVENTION

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area. Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present invention will be described.

FIG. 2 is a block diagram illustrating the structure of an XR electronic device 20 according to one embodiment of the present invention.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present invention will be described with reference to an example where the electronic device is applied to a Head Mounted Display (HMD). However, embodiments of the electronic device according to the present invention may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

FIG. 3 is a perspective view of an AR electronic device according to one embodiment of the present invention.

As shown in FIG. 3, the electronic device according to one embodiment of the present invention may include a frame 100, controller 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the controller 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The controller 200 is configured to control various electronic components installed in the electronic device.

The controller 200 may generate an image shown to the user or video comprising successive images. The controller 200 may include an image source panel that generates an image and a plurality of lenses that diffuse and converge light generated from the image source panel.

The controller 200 may be fixed to either of the two side frames 120. For example, the controller 200 may be fixed in the inner or outer surface of one side frame 120 or embedded inside one of side frames 120. Or the controller 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the controller 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 3, the electronic device may operate so that if the controller 200 projects light about an image onto one side of the display unit 300, the light is emitted to the other side of the display unit, and the image generated by the controller 200 is shown to the user.

Accordingly, the user may see the image generated by the controller 200 while seeing the external environment simultaneously through the opening of the frame 100. In other words, the image output through the display unit 300 may be seen by being overlapped with a normal view. By using the display characteristic described above, the electronic device may provide an AR experience which shows a virtual image overlapped with a real image or background as a single, interwoven image.

FIG. 4 is an exploded perspective view of a controller according to one embodiment of the present invention.

Referring to the figure, the controller 200 may include a first cover 207 and second cover 225 for protecting internal constituting elements and forming the external appearance of the controller 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the controller 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the controller 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 5 to 11 illustrate various display methods applicable to the display unit 300 according to one embodiment of the present invention.

More specifically, FIG. 5 illustrates one embodiment of a prism-type optical element; FIG. 6 illustrates one embodiment of a waveguide-type optical element; FIGS. 7 and 8 illustrate one embodiment of a pin mirror-type optical element; and FIG. 9 illustrates one embodiment of a surface reflection-type optical element. And FIG. 10 illustrates one embodiment of a micro-LED type optical element, and FIG. 11 illustrates one embodiment of a display unit used for contact lenses.

As shown in FIG. 5, the display unit 300-1 according to one embodiment of the present invention may use a prism-type optical element.

In one embodiment, as shown in FIG. 5(*a*), a prism-type optical element may use a flat-type glass optical element where the surface 300*a* on which image light rays are incident and from which the image light rays are emitted is planar or as shown in FIG. 5(*b*), may use a freeform glass optical element where the surface 300*b* from which the image light rays are emitted is formed by a curved surface without a fixed radius of curvature.

The flat-type glass optical element may receive the image light generated by the controller 200 through the flat side surface, reflect the received image light by using the total reflection mirror 300*a* installed inside and emit the reflected image light toward the user. Here, laser is used to form the total reflection mirror 300*a* installed inside the flat type glass optical element.

The freeform glass optical element is formed so that its thickness becomes thinner as it moves away from the surface on which light is incident, receives image light generated by the controller 200 through a side surface having a finite radius of curvature, totally reflects the received image light, and emits the reflected light toward the user.

As shown in FIG. 6, the display unit 300-2 according to another embodiment of the present invention may use a waveguide-type optical element or light guide optical element (LOE).

As one embodiment, the waveguide or light guide-type optical element may be implemented by using a segmented beam splitter-type glass optical element as shown in FIG. 6(a), saw tooth prism-type glass optical element as shown in FIG. 6(b), glass optical element having a diffractive optical element (DOE) as shown in FIG. 6(c), glass optical element having a hologram optical element (HOE) as shown in FIG. 6(d), glass optical element having a passive grating as shown in FIG. 6(e), and glass optical element having an active grating as shown in FIG. 6(f).

As shown in FIG. 6(a), the segmented beam splitter-type glass optical element may have a total reflection mirror 301a where an optical image is incident and a segmented beam splitter 301b where an optical image is emitted.

Accordingly, the optical image generated by the controller 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 6(b), the optical image generated by the controller 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 6(c) may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the controller 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 6(d) may have an out-coupler 304 inside the glass from which an optical image is emitted. Accordingly, the optical image is incoming from the controller 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 6(e) may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 6(f) may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present invention may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin minor-type optical element will be described with reference to FIGS. 7 and 8.

Referring to FIG. 7(a), the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole minor will be described again later.

The pinhole minor 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the controller 200 with the image of the real world.

And the display unit 300-3 may provide a path which guides the incident light to the pinhole mirror 310a through internal total reflection.

Referring to FIG. 7(b), the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the controller 200 through internal total reflection, the light incident by total reflection may be reflected by the pinhole mirror 310b installed on the surface on which external light is incident, and the reflected light may pass through the display unit 300-3 to reach the user's eyes.

Referring to FIG. 7(c), the incident light illuminated by the controller 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Referring to FIG. 7(d), the light illuminated by the controller 200 may reach the user's eyes by being reflected within the display unit 300-3 by the pinhole mirror 310d installed on the surface 300d from which external light is emitted. The controller 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the controller 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIG. 8 illustrates the shape of a pinhole mirror and structure of an array pattern according to one embodiment of the present invention.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

FIGS. 8(a) and (b) illustrate the Flat Pin Mirror scheme, and FIGS. 8(c) and (d) illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 8(a) and (b), a plurality of pinhole mirrors 310e may be disposed side by side along one direction on the inclined surface 300g and continuously display the augmented reality provided by the controller 200 on the image of a real world seen through the display unit 300-3 even if the user moves the pupil of the eye.

And referring to FIGS. 8(c) and (d), the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the controller 200 may be matched to each pinhole mirror.

As described above, by disposing a plurality of pinhole arrays 310f along the radial array, the double image problem of augmented reality provided by the controller 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present invention may employ the freeform combiner method as shown in FIG. 9(a), Flat HOE method as shown in FIG. 9(b), and freeform HOE method as shown in FIG. 9(c).

The surface reflection-type optical element based on the freeform combiner method as shown in FIG. 9(a) may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 9(b) may have a hologram optical element (HOE) 311 coated or patterned on the surface of flat glass, where an optical image emitted by the controller 200 passes through the HOE 311, reflects from the surface of the glass, again passes through the HOE 311, and is eventually emitted to the user.

The surface reflection-type optical element based on the freeform HOE method as shown in FIG. 9(c) may have a HOE 313 coated or patterned on the surface of freeform glass, where the operating principles may be the same as described with reference to FIG. 9(b).

In addition, a display unit 300-5 employing micro LED as shown in FIG. 10 and a display unit 300-6 employing a contact lens as shown in FIG. 11 may also be used.

Referring to FIG. 10, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the controller 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the controller 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 11, the display unit 300-6 may comprise a contact lens. A contact lens 300-6 on which augmented reality may be displayed is also called a smart contact lens. The smart contact lens 300-6 may have a plurality of optical elements 317 in a lattice structure at the center of the smart contact lens.

The smart contact lens 300-6 may include a solar cell 318a, battery 318b, controller 200, antenna 318c, and sensor 318d in addition to the optical element 317. For example, the sensor 318d may check the blood sugar level in the tear, and the controller 200 may process the signal of the sensor 318d and display the blood sugar level in the form of augmented reality through the optical element 317 so that the user may check the blood sugar level in real-time.

As described above, the display unit 300 according to one embodiment of the present invention may be implemented by using one of the prism-type optical element, waveguide-type optical element, light guide optical element (LOE), pin minor-type optical element, or surface reflection-type optical element. In addition to the above, an optical element that may be applied to the display unit 300 according to one embodiment of the present invention may include a retina scan method.

An electronic device 20 according to the present invention to be described below may be implemented as an HMD worn by a user, as illustrated in FIGS. 12 to 18.

FIG. 12 is an exploded perspective view of the electronic device according to the present invention, FIG. 13 is an exploded perspective view illustrating coupling of a view control plate and a moving unit according to an embodiment of the present invention, and FIG. 14 is a front view of the electronic device according to the present invention when viewed from the front. In addition, FIG. 15 is an enlarged diagram of the XV part shown in FIG. 14, FIG. 16 is a diagram illustrating that the view control plate is coupled to a first housing according to the present invention, and FIG. 17 is an enlarged diagram of the XVII part shown in FIG. 16. Further, FIG. 18 is a diagram illustrating the principle of controlling field of view by the view control plate according to the embodiment of the present invention.

As illustrated in FIG. 12, the electronic device 20 according to the present invention may be implemented as an HMD wearable on a head of a user, and include a first housing 510, a second housing 520, a view control plate 530, a pad 540, and a moving unit 550.

The first housing 510 forms an outer shape of the front portion of the electronic device 20 and has a plurality of first pinholes 5110 formed at a position corresponding to the eyes of the user. The second housing 520 forms an outer shape of the rear portion of the electronic device 20 and is coupled to the first housing 510 to form an overall outer shape of the electronic device 20.

Referring to FIG. 12, the second housing 520 is formed to be curved to correspond to the face shape of the user so that the second housing 520 comes into contact with the face of the user to cover the eyes of the user, and has a barrel hole 521 formed at a position corresponding to the eyes of the user. Therefore, the user may wear the electronic device 20, and watch the image output by the electronic device 20 through the barrel hole 521. In addition, the user may see ahead through the plurality of first pinholes 5110 regardless of whether the electronic device 20 outputs the image.

The second housing 520 may further include a head unit configured to cause the electronic device 20 according to the present invention to be worn on the head of the user. The head unit may further include a headrest surrounding the head of the user and a band adjustable in length according to a head size of the user.

Meanwhile, when the electronic device 20 outputs an image, the view control plate 530 and the pad 540 cover the first pinholes 5110 to block light coming from outside the electronic device 20 through the first pinholes 5110 as much as possible, which makes it possible for the user to concentrate on the image. In addition, when the electronic device 20 does not output an image such that the user directly views the external environment with the naked eyes, or it is necessary to overlap an image output from the electronic device 20 with objects disposed in the external environment, the electronic device 20 opens the first pinholes 5110 as much as possible, which makes it possible for the user to directly view the external environment with the naked eyes while wearing the electronic device 20.

In order to implement such a function, a plurality of second pinholes 5120 are formed in the view control plate 530, a plurality of third pinholes 5130 are formed in the pad 540, and the view control plate 530 and the pad 540 are disposed in the accommodating part formed in the interior created by the first housing 510 and the second housing 520 coupled to each other.

The pad 540 includes a first pad 541 and a second pad 542, and the first pad 541 and the second pad 542 are disposed to correspond to both eyes of the user, respectively. In particular, the first pad 541 and the second pad 542 are disposed between the view control plate 530 and the first housing 510. In this case, the first pad 541 and the second pad 542 may be configured to have elasticity. In addition, the third pinholes 5130 formed in the first pad 541 and the second pad 542 may be all formed on the first pad 541 and the second pad 542 to correspond to the positions of the first pinholes 5110 and the second pinholes 5120. That is, all the above-described first to third pinholes 5110, 5120, and 5130 may have the same number, and each of the first to third pinholes 5110, 5120, and 5130 is disposed on the same optical axis defined by the eyes of the user to correspond to the central axes to one another.

Referring to the examples of the first housing 510, the pad 540, and the view control plate 530 illustrated in FIGS. 14 to 17, one first pinhole 5110, one second pinhole 5120, and one third pinholes 5130 are disposed on the same optical axis and are in a state of being penetrated. In addition, light outside the electronic device 20 may enter the electronic device 20 through the first to third pinholes 5110, 5120, and 5130 in the state of being penetrated. That is, as illustrated in FIG. 15, when the electronic device 20 is viewed from the front of the electronic device 20, the first pinholes 5110 formed in the first housing 510 overlaps the third pinholes 5130 formed in the pad 540, but since the central axes of the first pinholes 5110 and the third pinholes 5130 are the same, a through hole h is formed. In addition, as illustrated in FIG. 17, even when the first housing 510 is viewed from the rear side, the second pinholes 5120 formed in the view control plate 530 and the third pinholes 5130 formed in the pad 540 overlap each other, but since the central axes of the second pinholes 5120 and the third pinholes 5130 are the same, the through hole h is formed. Therefore, the central axes of the first pinholes 5110 and the second pinholes 5120 are also the same.

Meanwhile, the moving unit 550 is configured to move the view control plate 530 toward the first housing 510. In the present invention, the movement of the view control plate 530 toward the first housing 510 may be defined as forward movement and the movement of the view control plate 530 toward the second housing 520 may be defined as backward movement.

To this end, the moving unit 550 may include a first gear 551, and the first gear 551 may further include a first thread. Referring to FIGS. 12 and 13, a first thread 5510 is formed along an inner circumferential surface of a first hole formed in a central portion of the first gear 551. Meanwhile, the first housing 510 may further include a second thread 5520 capable of male and female engagement with the first thread 5510. As illustrated in FIG. 12, the second thread 5520 is formed to protrude from the first housing 510 toward the second housing 520, and configured to be screw-coupled into the first gear 551 in which the first thread 5510 is formed.

In addition, the first gear 551 may be configured to be coupled to the view control plate 530. For this purpose, a coupling groove 5511 is formed in the first gear 551, and a gear receiving opening 5310 is formed in the view control plate 530. That is, the coupling groove 5511 of the first gear 551 is coupled to the gear receiving opening 5310, and the first gear 551 is coupled to the view control plate 530.

In addition, the moving unit includes a second gear 552, a third gear 553, a first rod 561, and a second rod 562, and the second gear 552 and the third gear 553 include a second hole 5521 and a third hole 5531 at their central portions, respectively. As illustrated in FIG. 12, the first rod 561 and the second rod 562 are coupled to the second hole 5521 and the third hole 5531, respectively, and fix the second gear 552 and the third gear 553 to the first housing 510.

Referring to FIGS. 13, 14, and 16, the first gear 551 is configured to be coupled to the second gear 552, and the second gear 552 is configured to be coupled to the third gear 553. In addition, the third gear 553 may be disposed to expose a portion of the third gear 553 to the outside of the second housing 520 such that the user may directly rotate the third gear 553 by hand. Therefore, when the user rotates the third gear 553 in a first direction r1, the second gear 552 rotates in a second direction r2, and the first gear 551 rotates in the first direction r1. The first direction r1 and the second direction r2 refers to opposite directions to each other as illustrated in FIG. 14.

Meanwhile, the electronic device 20 according to the present invention may further include a fisheye lens 560, a transparent display panel 570, and a counter lens 580. The fisheye lens 560 is disposed in the accommodating part formed in the interior created by the first housing 510 and the second housing 520 coupled to each other, and is mounted in the barrel hole 521 of the second housing 520. The transparent display panel 570 may be disposed between the view control plate 530 and the fisheye lens 560 to output an image under control of a control unit 27 to be described later. In addition, the counter lens 580 is a lens for correcting an image distortion that may occur when viewing an object outside the electronic device 20 through the fisheye lens 560 and has a function of allowing a user who views the external object with the naked eyes to accurately recognize a subject image when no image is displayed on the transparent display panel 570. The counter lens 580 may be disposed between the transparent display panel 570 and the view control plate 530.

In addition, the electronic device 20 according to the present invention may further include a control unit 27 for controlling the movement of the view control plate 530 according to whether the image is output to the transparent display panel 570 or the type of the image to be output. The control unit 27 may be configured to control the moving unit 550 such that the forward and backward movements of the view control plate 530 are automatically controlled.

That is, when an image is output to the transparent display panel 570, the control unit 27 may control the moving unit 550 such that the view control plate 530 moves toward the first housing 510, and the pad 540 is compressed by the view control plate 530, whereby the diameters of the third pinholes 5130 are reduced.

However, when no image is output to the transparent display panel 570, the control unit 27 may automatically control the moving unit 550 such that the view control plate 530 moves toward the second housing, whereby the compression against the pad 540 may be released, and the diameters of the third pinholes 5130 may be returned to their original sizes as the pad 540 is restored to an original shape by elasticity.

Hereinafter, referring to FIGS. 13 and 18, the operation of the view control plate 530 and the change of the third pinhole 5130 according to whether the image of the electronic device 20 according to the present invention is output will be described in more detail.

Defining the state in which the electronic device 20 according to the present invention does not output an image to the transparent display panel 570 as an initial state of the electronic device 20, the moving unit 550 prevents the view control plate 530 from compressing the first pad 541 and the second pad 542 in the initial state. As described above, a state where the view control plate 530 does not compress the first pad 541 and the second pad 542, and is positioned between the transparent display panel 570 and the first pad 541 and the second pad 542 may be defined as an idle state. Of course, even when the electronic device 20 according to the present invention outputs an image to the transparent display panel 570, the view control plate 530 may not be in the state of compressing the first pad 541 and the second pad 542. That is, even when an image is to be overlapped with an object disposed in the external environment of the electronic device 20, the view control plate 530 may be in an idle state in which the first pad 541 and the second pad 542 are not compressed.

In the idle state, since the view control plate 530 does not compress the first pad 541 and the second pad 542, the deformation of the first pad 541 and the second pad 542 does not occur, and the diameters of the third pinholes 5130 formed in the first pad 541 and the second pad 542 maintain the diameters of the initial state. As illustrated in FIG. 18(a), since the third pinholes 5130 having the diameters similar to the first pinholes 5110 formed in the first housing 510 maintain the diameters of the initial state, the third pinholes 5130 do not cover the first pinholes 5110. Therefore, the user wearing the electronic device 20 according to the present invention may view the outside of the electronic device 20 with the naked eyes through the first pinhole 5110.

However, when the electronic device 20 according to the present invention outputs an image to the transparent display panel 570, the user may manipulate the third gear 553 included in the moving unit 550 to cover the first pinholes 5110 so as to prevent the image displayed on the transparent display panel 570 from being disturbed by light coming from outside the electronic device 20.

For example, in a case where the electronic device 20 according to the present invention outputs an image to the transparent display panel 570, the second gear 552 rotates in the second direction r2 and the third gear 553 rotates in the first direction r1 when the user rotates the third gear 553 in the first direction r1. As the third gear 553 rotates in the first direction r1, the first thread may move toward the first housing 510 in engagement with the second thread 5520, and the view control plate 530 coupled to the third gear 553 may move together toward the first housing 510.

The view control plate 530 compresses the first pad 541 and the second pad 542 while moving toward the first housing 510, the first pad 541 and the second pad 542 having elasticity are compressively deformed, and the diameter of the third pinhole 5130 is deformed to be smaller than the original size by the deformation of the first pad 541 and the second pad 542. As illustrated in FIG. 18(b), as the diameter of the third pinhole 5130 decreases, the first pinhole 5110 may be covered, so that the light from outside the electronic device 20 may be prevented from coming in through the first pinhole 5110. Therefore, the user may view the image displayed to the transparent display panel 570 without being disturbed by the light entering from the outside.

In addition, when the view control plate 530 completes the movement, in order to maintain the state in which the view control plate 530 compresses the pad 540, the moving unit 550 may further include a stopper to prevent the first to third gears 551, 552, and 553 from rotating.

Then, when the electronic device 20 according to the present invention no longer outputs an image to the transparent display panel 570, as the user rotates the third gear 553 in the second direction r2, the second gear 552 rotates in the first direction r1, and the third gear 553 rotates in the second direction r2, such that the user may allow the view control plate 530 to move toward the second housing 520. In this case, the first thread 5510 formed in the third gear 553 moves toward the second housing 520 in engagement with the second thread 5520.

As the view control plate 530 moves toward the second housing 520 by the moving unit 550, that is, the view control plate 530 moves backward, the pressure applied to the pad 540 disappears and the pad 540 is restored to the original shape by elasticity. Then, the diameters of the third pinholes 5130 formed in the pad 540 are returned to their original sizes.

The above-described manipulation of the view control plate 530 may be performed by the user directly manipulating the third gear 553. Alternatively, a configuration in which the control unit 27 detects whether an image is displayed on the transparent display panel 570, and the third gear 553 is automatically manipulated under the control of the control unit 27 may be implemented.

In addition, the electronic device 20 according to the present invention may further include a sensing unit for sensing an external digital device and an inter-device communication module allowing data transmission and reception between the external digital device and the electronic device 20, and further include a processor classifying information to be displayed on the transparent display panel 570 and a memory storing data for operation of the electronic device 20.

The above-described control unit 27 may be configured to include a process, a memory, a sensing unit, and an inter-device communication module.

As described above, the electronic device 20 according to the present invention closes or opens the first pinholes 5110 formed in the first housing 510 according to whether an image is output. In this way, a user wearing the electronic device 20 may conveniently recognize the image displayed on the transparent display panel 570 as needed, or may conveniently recognize an object outside the electronic device 20.

Particular embodiments or other embodiments of the present invention described above are not mutually exclusive to each other or distinguishable from each other. Individual structures or functions of particular embodiments or other embodiments of the present invention described above may be used in parallel therewith or in combination thereof.

For example, it means that structure A described with reference to a specific embodiment and/or figure and structure B described with reference to other embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

INDUSTRIAL APPLICABILITY

An electronic device according to the present invention may be associated with an artificial intelligence module, robot, augmented reality (AR) device, virtual reality (VR) device, and device related to 5G services.

What is claimed is:

1. An electronic device that is wearable on a head of a user, the electronic device comprising:
   a first housing having a plurality of first pinholes formed at a position corresponding to an eye of a user;
   a second housing coupled to the first housing and coming into contact with a face of the user to cover the eye of the user;
   a view control plate having a plurality of second pinholes formed therein;
   a pad disposed between the view control plate and the first housing and having a plurality of third pinholes formed therein; and
   a moving unit moving the view control plate toward the first housing,
   wherein an accommodating part is formed in an interior created by the first housing and the second housing coupled to each other, and the view control plate and the pad are disposed in the accommodating part, and
   the pad is deformed, such that diameters of the third pinholes are reduced, when the view control plate is moved by the moving unit.

2. The electronic device of claim 1, wherein the plurality of first to third pinholes are disposed on the same optical axis defined by the eye of the user to correspond to one another, the moving unit is configured to move the view control plate forward and backward, and the pad is compressed when the view control plate moves toward the first housing.

3. The electronic device of claim 2, wherein the pad includes a first pad and a second pad, and the first pad and the second pad are disposed to correspond to both eyes of the user.

4. The electronic device of claim 2, wherein the pad is elastic.

5. The electronic device of claim 1, wherein the moving unit includes first to third gears, the first gear has a first thread formed along an inner circumferential surface of a first hole formed in a central portion of the first gear, and the first housing further includes a second thread for male and female engagement with the first thread.

6. The electronic device of claim 5, wherein the moving unit includes a first rod and a second rod fixing the second gear and the third gear to the first housing, the second gear and the third gear include a second hole and a third hole, respectively, and the first rod and the second rod are coupled to the second hole and the third hole, respectively.

7. The electronic device of claim 5, wherein the first gear is connected to the second gear, and the second gear is connected to the third gear, the second gear rotates in a second direction, and the first gear rotates in the first direction, when the third gear is rotated in a first direction, and the second direction is a direction opposite to the first direction.

8. The electronic device of claim 5, wherein the view control plate further includes a gear receiving opening to which the first gear is coupled.

9. The electronic device of claim 7, wherein a portion of the third gear is exposed outside the second housing such that the user rotates the third gear by hand.

10. The electronic device of claim 1, further comprising:
a fisheye lens disposed inside the accommodating part and mounted in the second housing; and
a transparent display panel disposed between the view control plate and the fisheye lens.

11. The electronic device of claim 10, further comprising: a counter lens disposed between the transparent display panel and the view control plate.

12. The electronic device of claim 10, further comprising:
a control unit controlling the moving unit to move the view control plate, wherein the control unit is configured to:
control the moving unit to move the view control plate toward the first housing, when an image is output to the transparent display panel; and
control the moving unit to move the view control plate toward the second housing, when no image is output to the transparent display panel.

13. The electronic device of claim 1, wherein a number of the first to third pinholes is all the same.

14. The electronic device of claim 1, further comprising:
a head unit connected to the second housing, wherein the head unit includes: a headrest surrounding the head of the user; and a band adjustable in length according to a head size of the user.

15. The electronic device of claim 1, further comprising:
a sensing unit for sensing an external digital device other than the electronic device;
an inter-device communication module allowing data transmission and reception between the external digital device sensed by the sensing unit and the electronic device;
a processor classifying information to be displayed on a transparent display panel when the information on the external digital device is received through the inter-device communication module; and
a memory storing data for operation of the electronic device, wherein the processor is configured to classify the information into a graphical user interface stored in advance in the memory to be displayed on the display panel.

* * * * *